US012696042B2

(12) United States Patent
Karlsen et al.

(10) Patent No.: US 12,696,042 B2
(45) Date of Patent: Jul. 28, 2026

(54) HEARING SYSTEM TO BE WORN AT A USER'S HEAD

(71) Applicant: Oticon Medical A/S, Smørum (DK)

(72) Inventors: Morten Brandt Karlsen, Smørum (DK); Adis Bjelosevic, Smørum (DK); David Ginty, Smørum (DK); Maja Thorning-Schmidt, Smørum (DK)

(73) Assignee: OTICON MEDICAL A/S, Smørum (DK)

( * ) Notice: Subject to any disclaimer, the term of this patent is extended or adjusted under 35 U.S.C. 154(b) by 172 days.

(21) Appl. No.: 18/495,905

(22) Filed: Oct. 27, 2023

(65) Prior Publication Data

US 2024/0056748 A1 Feb. 15, 2024

Related U.S. Application Data

(63) Continuation of application No. 18/106,224, filed on Feb. 6, 2023, now Pat. No. 11,849,287, which is a continuation of application No. 17/407,660, filed on Aug. 20, 2021, now Pat. No. 11,617,047.

(30) Foreign Application Priority Data

Aug. 21, 2020 (EP) .................................... 20192078

(51) Int. Cl.
*H04R 25/00* (2006.01)
*H04R 1/10* (2026.01)

(52) U.S. Cl.
CPC ......... *H04R 25/606* (2013.01); *H04R 1/1008* (2013.01); *H04R 25/65* (2013.01); *H04R 2460/13* (2013.01)

(58) Field of Classification Search
CPC .......................... H04R 25/606; H04R 2460/13
See application file for complete search history.

(56) References Cited

U.S. PATENT DOCUMENTS

| | | | | |
|---|---|---|---|---|
| 4,035,672 | A | 7/1977 | Beaverson et al. | |
| 7,076,077 | B2 | 7/2006 | Atsumi et al. | |
| 7,822,215 | B2 | 10/2010 | Carazo et al. | |
| 9,763,590 | B1 * | 9/2017 | Rood | A61B 5/291 |

(Continued)

FOREIGN PATENT DOCUMENTS

| | | | |
|---|---|---|---|
| CN | 104936104 | A | 9/2015 |
| EP | 1 404 146 | A1 | 3/2004 |

(Continued)

*Primary Examiner* — James K Mooney
(74) *Attorney, Agent, or Firm* — Birch, Stewart, Kolasch & Birch, LLP

(57) ABSTRACT

A hearing system is disclosed comprising a support unit, and at least one abutment unit, wherein the support unit supports the at least one abutment unit. The at least one abutment unit has a contact surface. The support unit is configured to be placed at a user's head such that the contact surface of the at least one abutment unit contacts the user's head in an area surrounding one of the user's ears, in particular, in an area of one of the user's mastoid bones. The at least one abutment unit comprises a contact element, the contact element being configured to transmit vibrations generated by a vibration generating unit towards the contact surface. The contact element is made of a fiber-reinforced plastic material.

18 Claims, 7 Drawing Sheets

(56) References Cited

U.S. PATENT DOCUMENTS

| | | | | |
|---|---|---|---|---|
| 2004/0197002 | A1* | 10/2004 | Atsumi | H04R 1/1066 381/381 |
| 2007/0041595 | A1* | 2/2007 | Carazo | H04R 17/00 29/896.21 |
| 2018/0310107 | A1* | 10/2018 | Westerkull | H04R 25/60 |

FOREIGN PATENT DOCUMENTS

| | | | |
|---|---|---|---|
| JP | 2005-229324 | A | 8/2005 |
| KR | 10-2009-0052171 | A | 5/2009 |
| WO | WO 2015/096434 | A1 | 7/2015 |

* cited by examiner

HEARING SYSTEM TO BE WORN AT A USER'S HEAD

This application is a Continuation of copending application Ser. No. 18/106,224, filed on Feb. 6, 2023, which is a Continuation of application Ser. No. 17/407,660, filed on Aug. 20, 2021 (now U.S. Pat. No. 11,617,047, issued Mar. 28, 2023), which claims priority under 35 U.S.C. § 119(a) to Application No. 20192078.2, filed in Europe on Aug. 21, 2020, all of which are hereby expressly incorporated by reference into the present application.

FIELD

The present disclosure relates to hearing systems to be worn at a user's head. More particularly, the disclosure relates to hearing systems using transmission of vibrations to a user's mastoid bone to generate a hearing perception of the user.

BACKGROUND

For certain hearing impaired users a viable way to improve their hearing significantly may be a so called bone anchored hearing system (BAHS) where an implant is typically anchored to the user's mastoid bone. The implant will have direct contact to the mastoid bone and therefore will transmit the structure-borne sound generated by an associated vibration generator much better to the cochlear than a non-surgical solution (typically implemented as so called neck-bands, head-bands, soft-bands, or sound connectors) where a layer of skin and underlying tissue has to transfer sound as mechanical vibrations to the user's mastoid bone. Hence, evaluating if good structure-borne sound transmission via the mastoid bone to the hearing apparatus is available and viable for a hearing impaired user is key for the user to be able to decide if such a bone anchored hearing system (BAHS) is a way that they want to move forward with. Therefore, a non-surgical hearing system that is optimized for transferring sound through skin into the mastoid bone and further to the cochlear, as an evaluation device, will give a much better representation of what a user can expect form having an implant.

In any case, comfort is important for such evaluation devices as the user should be able to wear the evaluation devices the whole day for many days for then to be able to properly evaluate the potential benefit from a bone anchored hearing system (BAHS). Previously known solutions typically have comfort issues as they apply too much pressure to a small area of the user's head. On the other hand, solutions that easily dislocate from their correct position and solutions that cannot be individually fitted to the user's head lead to dissatisfying evaluation results.

Therefore, there is a need to provide a solution that addresses at least some of the above-mentioned problems. In particular, there is a need to provide a solution that allows for improving user comfort while enabling proper evaluation if a bone anchored hearing system (BAHS) is a viable approach to improve a user's hearing.

SUMMARY

According to one aspect, the present disclosure relates to a hearing system comprising a support unit, and at least one abutment unit. The support unit may support the at least one abutment unit, wherein the at least one abutment unit has a contact surface. The support unit is configured to be placed at a user's head such that the contact surface of the at least one abutment unit contacts the user's head in an area surrounding one of the user's ears, in particular, in an area of one of the user's mastoid bones. The at least one abutment unit comprises a contact element, wherein the contact element is configured to transmit vibrations generated by a vibration generating unit towards the contact surface. The contact element may be made of a fiber-reinforced plastic material.

Forming the contact from a fiber-reinforced plastic material or a fiber none-reinforced plastic material yields a particularly light-weight and stiff design of the abutment unit. In addition or as an alternative, this effect of a stiff and light-weight structure may also be achieved or enhanced, respectively, by optimizing the abutment unit in a way that the size, shape and material of the contact element is selected to be at least close to the configuration absolutely necessary to transmit the appropriate amount of vibration energy to the user's head (in particular, the user's mastoid bone) from the vibration generating unit to the contact surface of the abutment unit (with the user's head). Here, the vibration generating device may be coupled to an appropriate sound processor for controlling the vibration generating device according to the hearing impairment and related requirements of the individual user.

It will be appreciated that such low weight and high stiffness have the advantage of pushing the second resonance frequency of the abutment unit further towards higher frequencies. This beneficially creates higher efficiency in the sound transmission (and, thus, the hearing assistance provided to the user) in the area of these higher frequencies. Higher efficiency in the sound transmission is obtained with lower weight and higher stiffness in the frequencies above the second resonance peak.

It will be appreciated that, in particular, the lowered weight (while keeping a similarly high level of stiffness) that can be achieved with a fiber-reinforced plastic material, plastic without glass, a non-glass filed nylon or a glass filed nylon in comparison to aluminum (which is typically used for such abutment structures) is particularly beneficial. Non-filed nylon weight less than glass reinforced nylon and this compensate for the less stiffness of the non-filed nylon.

For example nylon 12 or nylon 66 without glass performs better than aluminium, which is do to the lower weight though less stiffness, but the lower weight compensates for the less stiffness.

With certain variants, the fiber-reinforced plastic material may comprise fibers selected from a fiber group consisting of glass fibers, carbon fibers, aramid fibers, bio fibers (fibers from plant), mineral filed carbon nanofibers, silica and combinations thereof Δny of these fibers allow achieving particularly stiff and lightweight components with the advantages described above. The fiber none-reinforced plastic material may comprise plastic material selected from a plastic group consisting of nylon 12, nylon 66, liquid crystal polymer, Polyphenylen sulfid, Polyether ether ketone, Polyphthalamide, Acrylonitrile butadiene styrene, Polyoxymethylene, and a combination thereof.

With certain variants, the contact element may comprises a generally plate shaped contact section and a generally pin shaped connector section, wherein the contact section defines a plane of main extension, a radial direction and a circumferential direction, and the connector section defines a longitudinal axis. This provides a structure with a low volume and, hence, as such is of simple and light-weight design. It will be appreciated that this design may already achieve the benefits outlined above even without the use of a fiber-reinforced plastic material.

The connector section may protrude from the contact section in a direction facing away from the contact surface. The connector section, in the radial direction of the contact section, may be located substantially centrally at the contact section. Furthermore, the longitudinal axis of the connector section may be substantially perpendicular to the plane of main extension of the contact section. Any of these variants, alone or in arbitrary combination, yields a particularly simple and compact design which exhibits the advantages of low weight and high stiffness as described above.

With further variants, the contact section, in a perpendicular view onto the plane of main extension of the contact section, may have an outer contour selected from a group consisting of a section-wise curved contour, an elliptic contour, a circular contour, a section-wise polygonal contour. By this means an appropriately shaped contact surface yielding particularly good contact to the user's head in the region surrounding the user's ear (in particular, in the region of the user's respective mastoid bone) may be achieved.

With further variants, the contact section may have a thickness which tapers, in the radial direction, towards an outer contour of the contact section. These variants also yield a particularly simple and compact design which exhibits the advantages of low weight and high stiffness as described above.

With further variants, the contact section may have an interface surface facing away from the connector section, the interface surface being at least one of at least section-wise planar, least section-wise provided with ridges, at least a part of the ridges extending in the circumferential direction or in the radial direction. By this means an appropriately shaped contact surface yielding particularly good contact to the user's head in the region of the mastoid bone may be achieved. Moreover, in particular, the ridges may achieve a particularly light-weight yet stiff configuration. Again, these variants yield a particularly simple and compact design which exhibits the advantages of low weight and high stiffness as described above.

The contact section may have an interface surface facing away from the connector section, the interface surface may be connected to the skin of the user when wearing the hearing system. The interface surface may include a pattern of protrusions for improving the Maximum Force Output onto the skin. The protrusions may be dots, dimples and/or any other 3D shaped protrusions provided in a pattern across the interface surface.

The protrusions may be molded onto the interface surface and may consist of a material being different or the same as the interface surface. For example, the protrusions may consist of a thermoplastic elastomer material, such as Styrenic Block Copolymers, Thermoplastic Polyolefins, Thermoplastic Vulcanisates, Thermoplastic Polyurethanes, Thermoplastic Copolyester, and Thermoplastic Polyamides. With further variants, the contact section may have at least two radial recesses, the radial recesses at least one of extending inwards from the outer contour of the contact section, extending up to the connector section, and extending mutually collinear. Such radial recesses may contribute to a particularly light-weight yet stiff configuration. They may fully extend through the thickness of the contact section (i.e. be open towards both the side of the contact section facing towards and facing away from the user's head).

With further variants, the connector section may have a shape selected from a group consisting of a section-wise cylindrical shape, a section-wise conical shape, a section-wise prismatic shape, and combinations thereof. With further variants, the connector section may be at least section-wise hollow. Any of these variants, alone or in combination, enables particularly compact, light-weight and stiff designs with good vibration transmission.

With further variants, the connector section may form a support connector interface connected to the support unit. With yet further variants, the connector section, at an end facing away from the contact section, forms a vibration generator interface configured to connect to the vibration generating unit. Any of these variants, alone or in combination, enables achieving a compact overall design of the hearing system.

The vibration waves provided by a vibration generating unit travels through the support unit and onto the head of the user. If the travel distance of the vibration waves is as short as possible and as direct as possible, the efficiency of transferring the vibration waves onto the head of user is improved. Therefore, the support connector interface may be cylindrical, rectangular or any shape with a longitudinal length orthogonal to the head of the user with a solid core, i.e. a none-hollow core. Thereby, the vibration waves travels in a more straight line within the support connector interface. Furthermore, in comparison to a sound connector interface with a hollow core, the sound connector interface with a solid core becomes Stiffer, and thereby, the efficiency of transferring the vibration waves, i.e. sounds, improves.

It will be appreciated that the contact section of the contact element may directly form the contact surface of the abutment unit. With further variants, however, the abutment unit may comprise a cover element, wherein the cover element is connected to a contact section of the contact element and forms the contact surface of the abutment unit. By this means, particularly good contact may be made to the user's head. Such a cover element (also referred to herein as a contact pad) may enlarge the abutment surface area to the skin as the pad may adapt to the shape of the user's head at the contact location. The cover element further may increase friction between the hearing system and the user's head, thereby helping to keep the hearing system in its proper location.

It should be noted that the concept of having such a cover element is of its own technical significance and may achieve the beneficial effects as disclosed herein even without the specific design with the contact element formed from a fiber-reinforced plastic material.

With certain variants, the cover element is made of a cover element material selected from the group consisting of a polymer material, a polymer foam material, a polymer memory foam material, a polyurethane (PU) foam material, and a polymer foam material having a resonant frequency in the area of a resonant frequency of human skin, rubber foam, latex, neoprene, Thermoplastic elastomer (TPE) and combinations thereof. Any of these materials, alone or in combination, enables achieving a beneficial vibration transmission from the contact section to the user's bone structure.

It should be noted that at least some of these materials, in particular, polyurethane (PU) foam materials, may be tuned to have a similar resonant frequency as the human skin. As a result, better vibration energy transmission to the bone is achieved. This is due to the fact that an increasing fraction of the sound wave energy is reflected at the transition from one body to another the larger the difference is between the resonant frequencies of the two bodies. Hence, selecting a cover element material with a similar resonant frequency as human skin (possibly including the underlying tissue) yields an improved vibration energy transmission.

It will be appreciated that the extension of the cover element with respect to the contact section may be chosen as desired and necessary. With certain variants, the cover element may at least cover the contact section of the contact element. With certain variants, the cover element, in a radial direction of the contact element, may at least section-wise (in particular along its entire circumference) protrude beyond the contact section of the contact element. By this means a particularly favorable transition from the outer circumference of the contact element to the cover element may be achieved, which is not least beneficial in terms of user comfort. With certain variants, the cover element may protrude by 0.5 mm to 7 mm, preferably by 1 mm to 5 mm, or more preferably by 2 mm to 4 mm. This yields particularly favorable results.

The thickness of the cover element may be chosen as appropriate, for example, as for the material of the cover element and/or the contact pressure to be achieved and/or the amount of vibration energy to be transmitted. With certain variants, the cover element, in a direction perpendicular to a plane of main extension of the contact section, may have a maximum thickness ranging from 0.5 to 5 mm, preferably from 2 mm to 4 mm, more preferably from 2 mm to 3 mm. It will be appreciated that the thickness may be substantially constant across the extension of the cover element. With other variants, however, the thickness may noticeably vary across the extension of the cover element, for example, in order to adapt to the topography of the user's head in the region of the mastoid bone.

The contact surface may have any desired and suitable extension as long as the desired contact pressure (and, possibly, the desired contact pressure distribution) is achieved. With certain variants, the contact surface, in a radial direction of the contact element, may have a maximum diameter ranging from 10 mm to 15 mm, preferably from 15 mm to 40 mm, more preferably from 20 mm to 35 mm. By this means, particularly favorable contact situations may be achieved. In particular, contact situations may be achieved which are beneficial in terms of the contact pressure magnitudes and/or distributions finding a good balance between vibration energy transmission (i.e., hearing support) and user comfort.

With certain variants, the support unit and the at least one abutment unit may be configured such that the abutment unit, when contacting the user's head with the contact surface, for example, in an area of one of the user's mastoid bones, exerts a contact pressure on the user's head, the contact pressure resulting in an average contact pressure and a resultant contact force across the contact surface. At least some variants have a configuration where the contact pressure is kept close to but noticeably below (e.g., by at least 10%) the capillary closure pressure (typically about 0.37 $N/cm^2$) of the contacted tissue, thereby ensuring proper perfusion of the contacted tissue and, hence, long term user comfort, while at the same time achieving proper vibration energy transmission.

With some variants, the resultant contact force may range from 1N to 4N, preferably 2N to 3.5N, more preferably 2.5N to 3N. As the shape of the head varies from person to person, the capillary closing pressure variates, it is therefore of beneficial if the contact pressure is adjustable. This may be provided by adjusting the length of the support unit or by bending a the support unit. With some variants, the average contact pressure may range from $10N/cm^2$ to $60N/cm^2$, preferably $20N/cm^2$ to $50N/cm^2$, more preferably $35N/cm^2$ to $40N/cm^2$. These variants, alone or in combination, provide particularly favorable results as regards the balance between vibration energy transmission (i.e., hearing support) and user comfort. In particular, it has turned out that vibration energy transmission reaches a saturation level at these levels. Higher values for either the resultant contact force or the average contact pressure typically do not lead to noticeably increased vibration energy transmission while at the same time seriously affecting user comfort.

The support unit may comprise a contact pressure adjuster unit which is configured to adjust the contact pressure of the hearing system. The contact pressure adjuster unit may be configured to adjust a longitudinal length of the support unit. The contact pressure adjuster unit may comprise a spring which can be twisted in a longitudinal direction, and the stiffness increases, the contact pressure increases, as the spring becomes more twisted. Furthermore, the spring may be able to slide in a longitudinal length of the support unit and within the support unit such that when the spring is in a first position the contact pressure is low and in a second position the contact pressure is high. For example, in the second position a first spring end of the spring is arranged closer to a first free end of the support unit than in the first position.

It should be noted that the concept of having such resultant contact force levels or such average contact pressure levels is of its own technical significance and may achieve the beneficial effects as disclosed herein even without the specific design with the contact element formed from a fiber-reinforced plastic material.

With certain variants, the support unit and the at least one abutment unit may be configured such that the abutment unit, when contacting the user's head with the contact surface in an area of one of the user's mastoid bones, exerts a resultant contact force across the contact surface in a resultant contact force direction. The abutment unit may be mounted to the support unit by a decoupling unit. With some variants, the decoupling unit may decouple forces between the support unit and the abutment unit in directions transverse, in particular, perpendicular, to the resultant contact force direction. With some variants, the decoupling unit may decouple moments between the support unit and the abutment unit about an axis parallel to the direction of the resultant contact force direction. With some variants, the decoupling unit may be configured such that the abutment unit is substantially freely rotatable with respect to the support unit about an axis parallel to the direction of the resultant contact force direction.

These variants, alone or in combination, enable largely decoupling the weight of the support unit from the abutment unit. This has the beneficial effect that the contact conditions may be kept more uniform. Furthermore, user comfort may be enhanced. Moreover, the amount of sound or vibration energy passing to the support unit is reduced, which overall results in better vibration energy transfer, in particular, towards higher frequencies (in the human audible spectrum).

It should be noted that the concept of having such a decoupling unit is of its own technical significance and may achieve the beneficial effects as disclosed herein even without the specific design with the contact element formed from a fiber-reinforced plastic material.

With certain variants, the decoupling unit may comprise a damping unit, thereby, in particular, reducing the leakage of vibration into the support unit. With some variants, the decoupling unit comprises a damping material selected from a damping material group consisting of flurosilicone, silicone, fluorocarbon, rubber, TPE and combinations thereof. These variants, alone or in combination, enable a reduction of the leakage of vibration into the support unit with the beneficial effects as outlined above. The hardness of a material may be determined by a shore value, and it has been found that for silicon a shore value between 10 and 40 and for flurosilicone a shore value between 20 and 40 is of benefit as the efficiency of the sound transmission is ideal within the ranges. Specially, a shore value about 25 of flurosilicone results in an even more improved efficiency.

Mounting of the contact element to the support unit may be achieved in any desired and suitable way. With certain variants, the contact element may comprise a generally plate shaped contact section and a generally pin shaped connector section. The decoupling unit may be mounted to a part of the connector section. With some variants, the decoupling unit may be integrated in a mounting recess of the support unit. With certain variants, the connector section extends into a mounting recess of the support unit, in particular, through the mounting recess of the support unit. These variants, alone or in combination, enable achieving a particularly simple, compact and lightweight design.

It will be appreciated that the support unit may have any desired and suitable shape and configuration for supporting the abutment unit. In particular, while a configuration with the abutment unit contacting the user's head in an area of one of the user's mastoid bones is a widely used variant, it will be appreciated that the configuration may also be such that the abutment unit, when placed properly, contacts any other suitable part of the user's head.

With certain variants, the support unit may be a generally C-shaped unit with a first free end and a second free end. At least one of the free ends, in particular, each of the free ends, may accommodate an ear element configured to engage a part of one ear of the user to position the hearing system with respect to the user's head. It will be appreciated that the ear element may be shaped in any suitable way to provide stabilization of the hearing system at the user's head. With certain variants, it is a simple arm or hook element which is adjustable (e.g., by plastic deformation or one or more adjustable links). With some variants, the ear element is configured such that it does not apply forces to the user's head which tend to reduce the contact pressure at the contact surface of the abutment unit, thereby enabling maintaining a largely stable and defined contact pressure at the contact surface of the abutment unit.

In unilateral or monaural hearing support arrangements, the ear element may be located at the first free end and the abutment unit may be located in the area of the second free end. In bilateral or binaural hearing support arrangements, an ear element may be located at each of the first free end and the second free end and an abutment unit is located adjacent to each one of the ear elements.

With certain variants, the support unit may be configured such that the abutment unit, when contacting the user's head with the contact surface in an area of the user's mastoid bone on a first side of the user's head, exerts a resultant contact force across the contact surface in a resultant contact force direction by virtue of elastic deformation of the support unit, and the support unit may be configured such that the resultant contact force is substantially the only force exerted on the user's head on the first side of the user's head caused by the elastic deformation of the support unit. This configuration as well enables maintaining a largely stable and defined contact pressure at the contact surface of the abutment unit.

With certain variants, the support unit may be configured in the manner of a neck-band. With some variants, the support unit may be configured to be adjustable in its length between the first free end and the second free end.

With certain variants, the vibration generating unit may be operatively coupled to the at least one abutment unit, both forming part of a hearing device of the hearing system. The vibration generating unit may include a sound processing unit which is configured to process input sound signals captured (e.g., by one or more microphones) in order to generate appropriate vibration to be transmitted to the user's head in order to compensate for a hearing impairment of the user. With certain variants, the hearing system is or comprises a hearing aid.

In some situations, the support unit is not able to keep the hearing system on the head of the recipient. To solve this problem, a safety line may be applied to the support unit. The safety line may include a first end and a second end, and both ends may be applied to the support unit, and when the recipient is wearing the support unit, the safety line may be arranged across or around the head of the recipient.

The ends may be applied symmetrically to the support unit.

In one example, the ends of the safety line may be applied to the free ends of the support unit. In another example where each of the free ends of the support unit accommodates an ear element, the ends of the safety line may be applied on the support unit and between the free ends of the support unit, for example, in a hole applied into the support unit or a loop applied onto the support unit.

The safety line may be a headband, but preferably, a line made of nylon line or a microfiber material, such as a fishline. The color of the line should either be transparent or a color which matches the hair of the recipient. The thickness of the line may vary between 0.08 mm to 5 mm, but preferably, between 0.08 mm to 0.6 mm.

The advantage of using the line is that the recipient can hide the line in between the hair of the recipient. Thereby, a discrete safety line is obtained in view of a headband which is not able to be hidden between the hair.

The line may be combined with fake hair to hide the safety line even more. The fake hair may be attached to the line and between the first end and the second end.

The vibration generating unit may be disconnected from the support unit and connected to an abutment attached to the skull via an implant screw or a magnetic interface. The safety line may be applied directly on to the vibration generating unit. The vibration generating unit may include at least two engaging means arranged around a center point of the vibration generating unit. The at least two engaging means may be a hole, or an interface configured to receive a locking mean. The locking mean may be applied to one or both ends of the safety line. The at least two engaging means may be moveable within the vibration generating unit for the purpose of optimizing the angle of the vibration generating unit on the head of the recipient. The at least two engaging means may be slidable within the vibration generating unit. The at least two engaging means may be connected to the vibration generating unit at one or more points. In an example where an engaging mean is connected to two points on the vibration generating unit the risk of twisting the vibration generating unit while the recipient is moving his/her head is reduced in comparison to a one point connection. The one or more points may be separate points.

The safety line may include a disengaging mean configured to disengage the safety line from the vibration generating unit or the support unit. The disengaging mean may be applied permanently to one or more ends of the safety line, for example, the first end and/or the second end. In this example, the disengaging mean is configured to engage and disengage from the support unit or the vibration generating unit. In another example, the safety line may include a third and a fourth end, where the third end and the fourth end are connected via another disengaging mean.

In another example, the disengaging mean may be the engaging means that are configured to be in a disengaging mode and/or an engaging mode.

In some situations the placement of the support unit on the user's head may vary from time to time. These slight variations in placement have a relatively large consequence of significantly altering the transfer function from the point of stimulation to the point of perception. The user needs therefore daily to get used to a slightly different sound experience and adapt the perception especially in difficult situations. This can be quite exhausting and challenging for the user. There are at least two components that contribute to the transfer function of the hearing system. The one is the placement of the contact surface onto the skin of the user's head. The other is the strength of the support unit on the user's head, i.e. how tight the support unit is applied to the head. Both components vary daily and can cause a variation of up to 15-20 dB at individual frequencies of the transfer function. To overcome this variation the hearing system may include one or more EEG electrodes on the support unit and in contact with the skin of the head. The hearing system may include a processing unit connected to the one or more EEG electrodes, and the processing unit may be configured to adjust individual gain and/or compression setting of a vibration generating unit based on a measured hearing threshold, such as an auditory steady-state response (ASSR), performed by the one or more EEG electrodes. The processing unit may be arranged within the support unit or within the vibration generating unit. For example, when the vibration generating unit is in contact with the at least one abutment unit of the support unit a connection between the one or more EEG electrodes and the vibration generating unit is established. The support unit may include an electrical plug which is configured to receive a connector of the vibration generating unit. In another example, the support unit includes a first transceiver interface configured to communicate with the vibration generating unit which includes a second transceiver interface. The communication between the first and the second transceiver interface may be based on Bluetooth, Bluetooth Low energy, or inductive communication or any short-range communication protocol. The first transceiver may be connected to the processing unit or directly to the one or more EEG electrodes. The communication between the support unit and the vibration generating unit may include the hearing threshold measurements. The one or more EEG electrodes may be arranged on one side of the head. In another example, the one or more EEG electrodes may include a first EEG electrode and a second EEG electrode, and where both EEG electrodes are arranged on each their side of the head. Having at least two EEG electrodes improves the quality of the hearing threshold measurement. Furthermore, by arranging the at least two EEG electrodes on both sides will improve the reliability of the adjusted gain and/or compression settings as the two hearing threshold measurements will be correlated.

The processing unit and/or the EEG electrodes are powered by a battery arranged within the support unit or within the vibration generating unit.

The one or more EEG electrodes may include a first EEG electrode and a reference electrode, and the first EEG electrode is arranged on one side of the head and the reference electrode may be arranged on another side of the head, e.g. on a side being opposite to the one side.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical parts, while the reference numerals corresponding parts vary by a multiple of 100 added. The individual features of each aspect may each be combined with any or all features of the other aspects. These and other aspects, features and/or technical effect will be apparent from and elucidated with reference to the illustrations described hereinafter in which:

DETAILED DESCRIPTION

General Remarks

Figure 1:
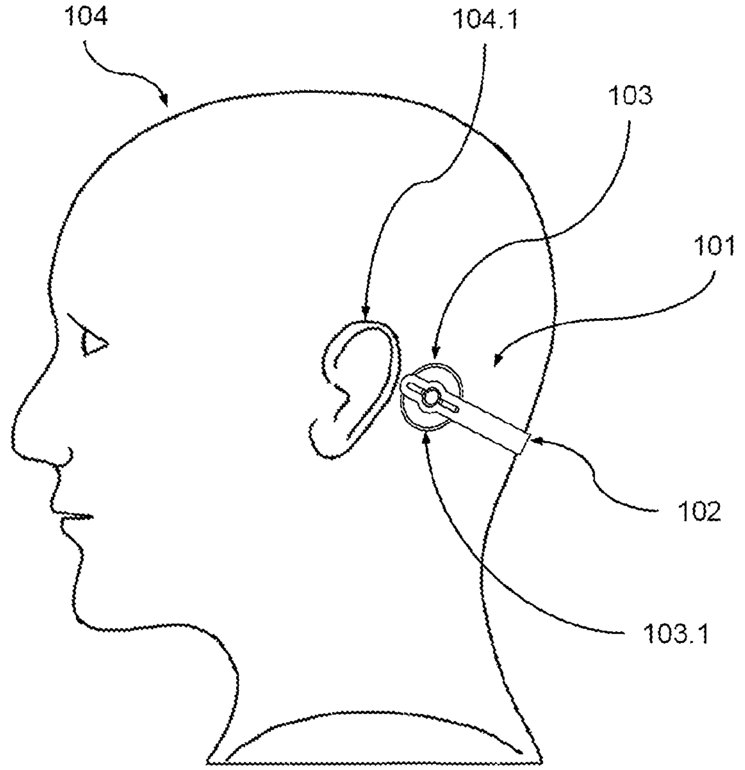
FIG. 1 is a schematic side view of a user's head with a variant of the hearing system according to the present disclosure.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A "hearing device" may be or include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. The "hearing device" may further refer to a device such as a hearable, an earphone or a headset adapted to receive an audio signal electronically, possibly modifying the audio signal and providing the possibly modified audio signals as an audible signal to at least one of the user's hearing system. While, generally, such audible signals may be provided in the form of an acoustic signal radiated into the user's outer ear and/or through parts of the middle ear of the user or electric signals transferred directly or indirectly to the cochlear nerve and/or to the auditory cortex of the user, according to the present disclosure, an acoustic signal is mainly transferred as mechanical vibrations to the user's inner ears through bone structure of the user's head.

A "hearing system" refers to a system comprising one or two hearing devices, and a "binaural hearing system" or a bimodal hearing system refers to a system comprising two hearing devices where the devices are adapted to cooperatively provide audible signals to both of the user's ears. The hearing system, the binaural hearing system or the bimodal hearing system may further include one or more auxiliary device(s) that communicate with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may generally include an output transducer such as a loudspeaker/receiver for providing an air-borne acoustic signal to the ear of the user, a mechanical stimulation applied transcutaneously or percutaneously to the skull bone, an electrical stimulation applied to auditory nerve fibers of a cochlea of the user. In some hearing devices, the output unit may include one or more output electrodes for providing the electrical stimulations such as in a Cochlear Implant, or the output unit may include one or more vibrators for providing the mechanical stimulation to the skull bone.

First Example

Referring to FIGS. 1 to 4 an example of a hearing system 101 according to the present disclosure will now be described in greater detail. The hearing system 101 comprises a support unit 102 and an abutment unit 103 resting against the head 104 of a user.

In the present example, the support unit 102 is a generally C-shaped unit placed around the user's neck (hence, sometimes referred to as a neck band) and having a first free end 102.1 and a second free end 102.2. The abutment unit 103 is arranged in the area of the first free end 102.1, whereas the second free end 102.2 accommodates an ear element 102.3 configured to engage a part of one ear of the user to position the hearing system 101 with respect to the user's head 104 as will be explained further below.

The support unit 102 supports the abutment unit 103, such that a contact surface 103.1 of the abutment unit 103 contacts the user's head 104. More precisely, the support unit 102 is placed at the user's head 104 such that the contact surface 103.1 of the abutment unit 103 contacts the user's head 104 in an area surrounding one of the user's ears 104.1 (here the left ear 104.1), namely in an area of the user's (left) mastoid bone.

Figure 3:
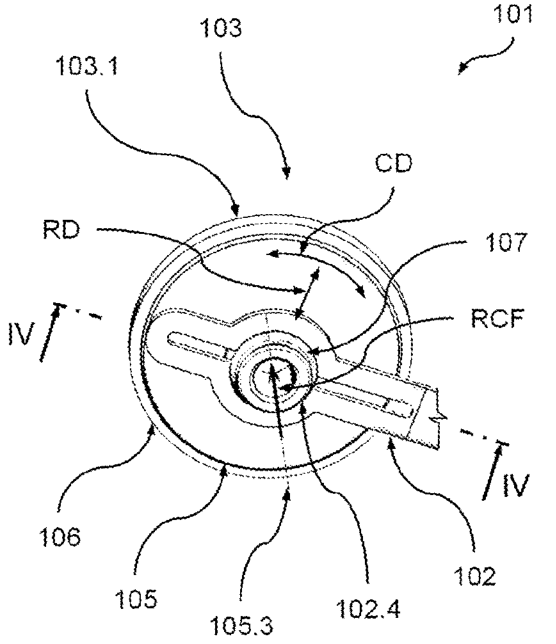
FIG. 3 is a schematic perspective view of a detail of the hearing system of FIG. 1 (detail III of FIG. 2)
Figure 4:
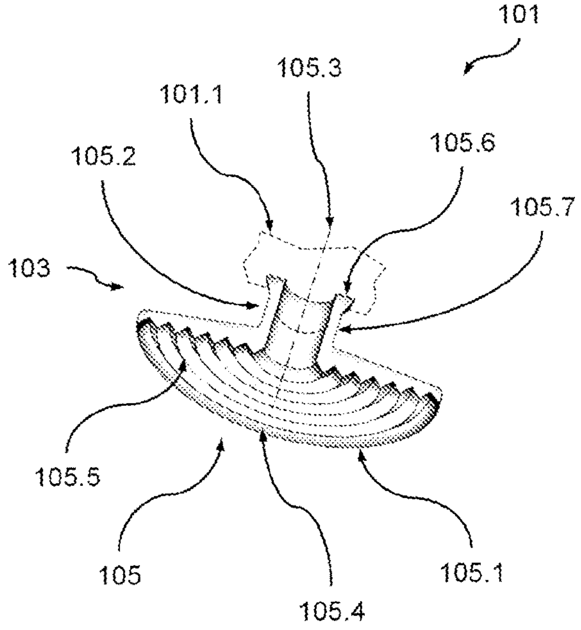
FIG. 4 is a schematic perspective sectional view (in a section along line IV-IV of FIG. 3) of a part of the hearing system of FIG. 1.

As can be seen particularly well from FIGS. 3 and 4, the abutment unit 103 comprises a contact element 105, wherein the contact element 105 is configured to transmit vibrations generated by a vibration generating unit (indicated in a highly schematic way by contour 101.1 in FIG. 4) towards the contact surface 103.1. It will be appreciated that a contact section 105.1 of the contact element may directly form the contact surface 103.1 of the abutment unit 103. In the present example, however, the abutment unit 103 comprises a cover element 106, which is connected to the contact section 105.1 of the contact element 105 and forms the contact surface 103.1 of the abutment unit 103

In the present example, the contact element is made of a fiber-reinforced plastic material. Forming the contact element 105 from a fiber-reinforced plastic material yields a particularly light-weight and stiff design of the abutment unit 103. It will be appreciated, however, that this effect of a stiff and light-weight structure may also be achieved or further enhanced, respectively, by optimizing the abutment unit 103 in a way that the size, shape and material of the contact element 105 is selected to be at least close to the configuration absolutely necessary to transmit the appropriate amount of vibration energy to the user's head 104 (in particular, the user's mastoid bone) from the vibration generating unit to the contact surface 103.1 of the abutment unit 103 contacting the user's head 104. Here, the vibration generating device may be coupled to an appropriate sound processor for controlling the vibration generating device according to the hearing impairment and related requirements of the individual user as has been explained above.

It will be appreciated that such low weight and high stiffness of the contact element 105 have the advantage of pushing the second resonance frequency of the abutment unit 103 further towards higher frequencies. This beneficially creates higher efficiency in the sound transmission (and, thus, the hearing assistance provided to the user) in the area of these higher frequencies.

It will be further appreciated that, in particular, the lowered weight of the contact element 105 (while keeping a similarly high level of stiffness) that can be achieved with a fiber-reinforced plastic material in comparison to aluminum (which is typically used for such abutment structures) is particularly beneficial.

The fiber-reinforced plastic material of the contact element 105 may comprise fibers selected from a fiber group consisting of glass fibers, carbon fibers, aramid fibers, bio fibers (fibers from plant), mineral filed carbon nanofibers, silica and combinations thereof Δny of these fibers allow achieving a particularly stiff and lightweight contact element 105 with the advantages described above.

As can be inferred from FIGS. 3 and 4, the contact element 105 may comprises a generally plate shaped contact section 105.1 and a generally pin shaped connector section 105.2. The contact section 105.1 defines a plane of main extension, a radial direction RD and a circumferential direction CD (which both extend in the plane of main extension). The connector section 105.2 defines a longitudinal axis 105.3. This configuration already provides a contact element 105 with a low volume and, hence, as such is of simple and light-weight design. It will be appreciated that this design may already achieve the benefits outlined above even without the use of a fiber-reinforced plastic material.

The connector section 105.2 protrudes from the contact section 105.1 in a direction facing away from the contact surface 103.1 of the abutment unit 103. The connector section 105.2, in the radial direction RD of the contact section 105.1, is located substantially centrally at the contact section 105.1. Furthermore, the longitudinal axis 105.3 of the connector section 105.2 is at least substantially perpendicular to the plane of main extension of the contact section 105.1. This yields a particularly simple and compact design which exhibits the advantages of low weight and high stiffness as described above.

In the present example, the contact section 105.1, in a perpendicular view onto the plane of main extension of the contact section (i.e., seen along the longitudinal axis 105.3) has a generally circular outer contour. By this means an appropriately shaped contact conditions yielding particularly good contact to the user's head 104 in the region of the user's mastoid bone may be achieved in a simple manner.

It will be appreciated however that, with further variants, the contact section 105.1, in such a perpendicular view onto the plane of main extension of the contact section 105, may also have any other suitable outer contour. In particular, the contact section 105 may have an outer contour selected from a group consisting of a section-wise curved contour, an elliptic contour, a circular contour, a section-wise polygonal contour.

As can best be seen from FIG. 4, in the present example, the contact section 105.1 has a thickness (a dimension along the longitudinal axis 105.3) which tapers, in the radial direction RD, towards an outer contour of the contact section 105.1. This also yields a particularly simple and compact design of the contact element 105 which exhibits the advantages of low weight and high stiffness as described above, and is particularly well adapted to the transmission of vibration energy into the user's head 104.

As further be seen from FIG. 4, in the present example, the contact section 105.1 has an interface surface 105.4 facing away from the connector section 105.2 and facing towards the cover element 106, wherein the interface surface 105.4 is a structured surface with a plurality of generally circular and generally concentric ridges 105.5 extending in the circumferential direction CD. By this means an interface surface 105.4 is achieved which interfaces with the cover element 106 and is particularly suitable for efficient vibration energy transfer into the cover element 106 and onwards to the user's head 104. Ultimately, the combination of this interface surface 105.4 with the cover element 106 allows achieving an appropriately shaped contact surface 103.1 yielding particularly good contact to the user's head 104 in the region of the mastoid bone. Moreover, in particular, the ridges 105.5 contribute to a particularly light-weight yet stiff configuration of the contact element 105, which exhibits the corresponding advantages as described above.

In the present example, the connector section 105.2 has a hollow, generally (circular) cylindrical shape, which provides a particularly compact, light-weight and stiff design with good vibration transmission and further allows simple mechanical coupling to a vibration generating device. At the end facing away from the contact section 105.1, the connector section 105.2 is of conical shape to form an interface 105.6 (e.g., a snap-on interface) for connection of the vibration generating unit 101.1. It will be appreciated, however, that other variants may also have any other suitable design of the connector section 105.2, for example, a section-wise conical shape, a section-wise prismatic shape, and combinations thereof.

It will be appreciated that the cover element 106 may enlarge the abutment surface area to the user's skin as the cover element 106 may adapt to the shape of the user's head 104 at the contact location. The cover element 106 further may increase friction between the hearing system 101 and the user's head 104, thereby helping to keep the hearing system 101 in its proper location.

The cover element 106 may be made of a cover element material selected from the group consisting of a polymer material, a polymer foam material, a polymer memory foam material, a polyurethane (PU) foam material, and a polymer foam material having a resonant frequency in the area of a resonant frequency of human skin, rubber foam, latex, neoprene, Thermoplastic elastomer (TPE) and combinations thereof. Any of these materials, alone or in combination, enables achieving a beneficial vibration transmission from the contact section 105.1 to the user's bone structure.

It should be noted again that at least some of these cover element materials, in particular, polyurethane (PU) foam materials, may be tuned to have a similar resonant frequency as the human skin. As a result, better vibration energy transmission to the bone is achieved. This is due to the fact that an increasing fraction of sound wave energy is reflected at the transition from one body to another the larger the difference is between the resonant frequencies of the two bodies. Hence, selecting a cover element material with a similar resonant frequency as human skin (possibly including the underlying tissue) yields an improved vibration energy transmission.

It will be appreciated that the extension of the cover element 106 with respect to the contact section 105.1 may be chosen as desired and necessary. As can be seen well from FIG. 3, in the present example, the cover element 106 not only fully covers the contact section 105.1 but also (along its entire circumference) protrudes beyond the contact section 105.1 in the radial direction RD of the contact element 105. By this means a particularly favorable transition from the outer circumference of the contact element 105 to the cover element 106 may be achieved, which is not least beneficial in terms of user comfort. With certain variants, the cover element may protrude by 0.5 mm to 7 mm, preferably by 1 mm to 5 mm, or more preferably by 2 mm to 4 mm. This yields particularly favorable results.

The thickness of the cover element 106 may be chosen as appropriate, for example, as for the material of the cover element and/or the contact pressure to be achieved and/or the amount of vibration energy to be transmitted. With certain variants, the cover element 106, in the direction perpendicular to the plane of main extension of the contact section 105.1 (i.e., along axis 105.3), may have a maximum thickness ranging from 0.5 to 5 mm, preferably from 2 mm to 4 mm, more preferably from 2 mm to 3 mm.

It will be appreciated that the thickness of the cover element 106 may be substantially constant across the extension of the cover element 106. With other variants, however, the thickness may noticeably vary across the extension of the cover element 106, for example, in order to adapt to the topography of the user's head 104 in the respective contact region, e.g., the region of the mastoid bone. Furthermore, in the present example, the cover element 106 may be complimentarily structured to match the structured surface of the contact section 105.1 with its circular ridges 105.5, thereby yielding a particularly favorable mechanical interface between the contact element 105 and the cover element 106.

It will be appreciated that the contact surface 103.1 may have any desired and suitable extension as long as the desired contact pressure (and, possibly, the desired contact pressure distribution) is achieved across the contact surface 103.1. With certain variants, the contact surface 103.1, in the radial direction RD of the contact element 105, may have a maximum diameter ranging from 10 mm to 15 mm, preferably from 15 mm to 40 mm, more preferably from 20 mm to 35 mm. By this means, particularly favorable contact situations may be achieved. In particular, contact situations may be achieved which are beneficial in terms of the contact pressure magnitudes and/or distributions finding a good balance between vibration energy transmission (i.e., hearing support) to the user's bone structure and user comfort.

In the present example, the support unit 102 and the abutment unit 103 are configured such that the abutment unit 103, when contacting the user's head 104 with the contact surface 103.1 (in the area of the user's left mastoid bone), exerts a contact pressure CP on the user's head 104. This contact pressure CP results in an average contact pressure ACP and a resultant contact force RCF across the contact surface 103.1. At least some variants have a configuration where the contact pressure CP at any contact location across the contact surface 103.1 is kept close to but noticeably below (e.g., by at least 10%) the capillary closure pressure (typically about 0.37 $N/cm^2$) of the contacted tissue, thereby ensuring proper perfusion of the contacted tissue and, hence, long term user comfort, while at the same time achieving proper vibration energy transmission.

With some variants, the resultant contact force RCF may range from 1N to 4N, preferably 2N to 3.5N, more preferably 2.5N to 3N. With some variants, the average contact pressure ACP may range from 10$N/cm^2$ to 60$N/cm^2$, preferably 20$N/cm^2$ to 50$N/cm^2$, more preferably 35$N/cm^2$ to 40$N/cm^2$. These variants, alone or in combination, provide particularly favorable results as regards the balance between vibration energy transmission (i.e., hearing support) and user comfort. In particular, it has turned out that vibration energy transmission reaches a saturation level at these levels, and higher values for either the resultant contact force RCF or the average contact pressure ACP typically do not lead to noticeably increased vibration energy transmission while at the same time seriously affecting user comfort.

In the present example, the support unit 102 and the abutment unit 103 are configured such that the abutment unit 103, when contacting the user's head 104 with the contact surface 103.1 in the area of the user's left mastoid bone, exerts a resultant contact force RCF across the contact surface 103.1 in a resultant contact force direction RCFD. The abutment unit 103 is mounted to the support unit 102 by a decoupling unit 107, wherein the decoupling unit 107 decouples forces between the support unit 102 and the abutment unit 103 in directions transverse, in particular, perpendicular, to the resultant contact force direction RCFD of the resultant contact force RCF. With some variants, the decoupling unit 107 may also decouple moments between the support unit 102 and the abutment unit 103 about an axis parallel to the direction of the resultant contact force direction RCFD. With some variants, the decoupling unit 107 may, for example, be configured such that the abutment unit 103 is substantially freely rotatable with respect to the support unit 102 about an axis parallel to the direction of the resultant contact force direction RCFD.

These variants, alone or in combination, enable largely decoupling the weight of the support unit 102 from the abutment unit 103. This has the beneficial effect that the contact conditions between the abutment unit 103 and the user's head 104 may be kept more uniform. Furthermore, user comfort may be enhanced. Moreover, the amount of sound or vibration energy passing to the support unit 102 is reduced by the use of such a decoupling unit 107, which overall results in better vibration energy transfer, in particular, towards higher frequencies (in the human audible spectrum).

With certain variants, the decoupling unit 107 may comprise or form a damping unit, thereby, in particular, reducing the leakage of vibration into the support unit 102. With some variants, the decoupling unit 107 thus may comprise a damping material selected from a damping material group consisting of fluorosilicone, rubber, TPE and combinations thereof. These variants, alone or in combination, enable a reduction of the leakage of vibration into the support unit 102 with the beneficial effects as outlined above.

As can be seen from FIGS. 3 and 4, in the present example, the connector section 105.2 forms a support connector interface 105.7 where the contact element 105 is connected to the support unit 102 by means of the decoupling unit 107. This contributes to achieving a compact overall design of the hearing system 101. The decoupling unit 107 is integrated in a mounting recess 102.4 of the support unit 102. In the present example, the connector section 105.2 of the contact element 105 extends into and through the mounting recess 102.4 of the support unit 102. These variants, alone or in combination, enable achieving a particularly simple, compact and lightweight design.

It will be appreciated that the ear element 102.3 of the support unit 102 may be shaped in any suitable way to provide stabilization of the hearing system 101 at the user's head 104. In the present example, the ear element 102.3 is a simple arm or hook element which is adjustable (e.g., by plastic deformation or one or more adjustable links) to adapt to the user's ear 104.1. With some variants, the ear element 102.3 is configured such that it does not apply forces to the user's head 104 which tend to reduce the contact pressure CP at the contact surface 103.1 of the abutment unit 103, thereby enabling maintaining a largely stable and defined contact pressure CP at the contact surface 103.1 of the abutment unit 103.

With certain variants, the support unit 102 may be configured such that the abutment unit 103, when contacting the user's head 104 with the contact surface 103.1 (e.g., in the area of the user's mastoid bone) on one side (e.g., a first side) of the user's head 104 (as shown in FIG. 1), exerts the resultant contact force RCF across the contact surface 103.1 in the resultant contact force direction RCFD by virtue of elastic deformation of the support unit 102. Here, the support unit 102 may be configured such that the resultant contact force RCF is substantially the only force exerted on the user's head 104 on that one (first) side of the user's head 104 caused by the elastic deformation of the support unit 102. This configuration as well enables maintaining a largely stable and defined contact pressure CP at the contact surface 103.1 of the abutment unit 103.

Figure 2:
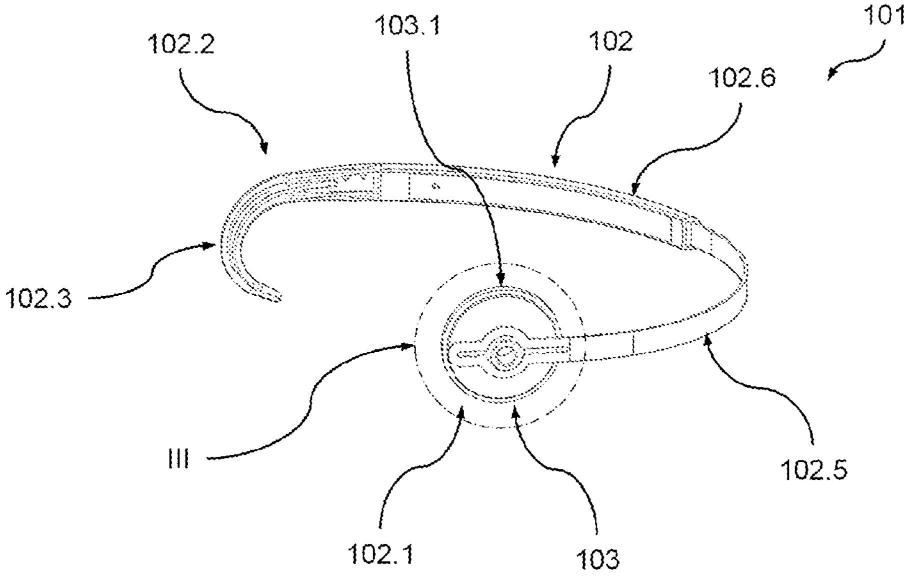
FIG. 2 is a schematic perspective view of the hearing system of FIG. 1.

As can be inferred from FIG. 2, the support unit 102 may be configured in the manner of a so called neck-band, which is adjustable in its length between the first free end 102.1 and the second free end 102.2. Adjustment may be achieved by a sliding and locking mechanism between a first support unit part 102.5 and a second support unit part 102.6 of the support unit 102.

In the present example, the vibration generating unit (indicated in a highly schematic way by contour 101.1 in FIG. 4) is operatively coupled to the abutment unit 103, both forming part of a hearing device of the hearing system 101. The hearing device may be a hearing aid where the vibration generating unit 101.1 includes a sound processing unit which is configured to process input sound signals captured (e.g., by one or more microphones) in order to generate appropriate vibration to be transmitted to the user's head 104 in order to compensate for a hearing impairment of the user as generally explained above.

Figure 8:
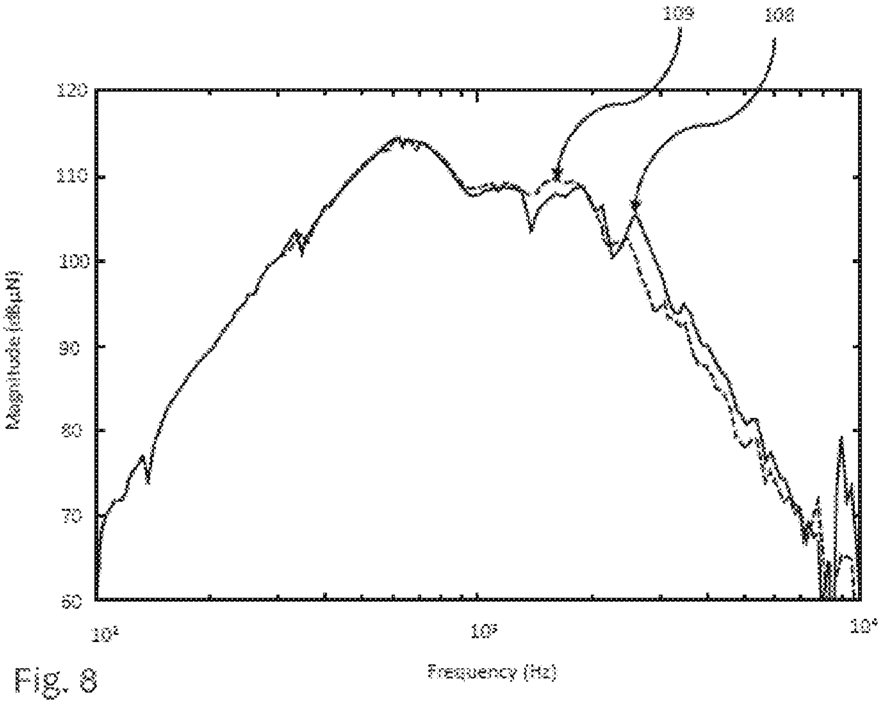
FIG. 8 is a diagram reflecting the magnitude of vibration energy transmitted to a user's head with variants of the hearing system according to the present disclosure.

As noted above, FIG. 8 is a diagram reflecting the magnitude of vibration energy transmitted to a user's head 104 using a contact element 105 made from a fiber-reinforced plastic material (solid line 108) compared to using a contact element of identical shape but made from aluminum material (dashed line 109). In the example reflected by line 108 the fiber-reinforced plastic material is a glass fiber reinforced acrylonitrile butadiene styrene (ABS), while in the example reflected by line 109 the material is an aluminum (Al) from the aluminum 6000 series. As can be seen from FIG. 8, the low weight and high stiffness of the contact element 105 made from the fiber-reinforced plastic material has the advantage of pushing the second resonance frequency of the abutment unit 103 further towards higher frequencies. This beneficially creates higher efficiency in the sound transmission (and, thus, the hearing assistance provided to the user) in the area of these higher frequencies. It will be appreciated that a similar effect can also be achieved with all the other fiber-reinforced plastic material referred to herein.

Second Example

Figure 5:
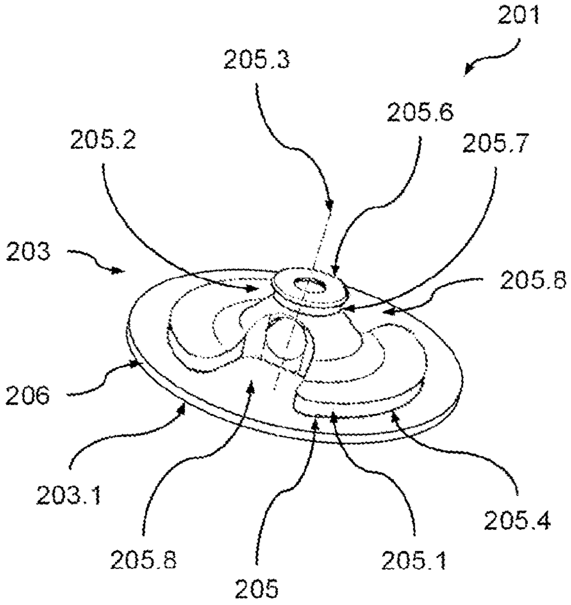
FIG. 5 is a schematic perspective view of a detail of a further variant of the hearing system according to the present disclosure.

In the following, a further example of a hearing system 201 with an abutment unit 203 according to the present disclosure will be described with reference to FIG. 5. The hearing system 201 in its basic design and functionality corresponds to the hearing system 101 of the first example. In particular, the abutment unit 203 and may simply replace the abutment unit 103 in the hearing system of FIGS. 1 to 4. While identical components are given the same reference, like components are given a reference increased by the value 100 (compared to the first example). Unless stated otherwise in the following, as regards the properties and functionality of these components, explicit reference is made to the explanations given above in the context of the first example.

One difference with respect to the first example lies in the design of the contact element 205. First, the contact section 205.1 has a generally planar interface surface 205.4 facing away from the connector section 205.2 and facing towards the cover element 206. Moreover, the contact section 205.1 has two mutually collinear radial recesses 205.8 that extend inwards from the outer contour of the contact section 205.1 up to the connector section 205.2. The radial recesses 205.8 fully extend through the thickness of the contact section 205.1 (i.e., the radial recesses 205.8 are open towards both the side of the contact section 205.1 facing towards and facing away from the user's head 104). Hence, in a view along axis 205.3 (i.e., perpendicular onto the plane of main extension of the contact section 205.1, a generally centrally waisted or hour glass shaped outer contour is achieved.

The radial recesses 205.8 contribute to a particularly light-weight yet stiff configuration of the contact element 205. A further advantage of the radial recesses 205.8 is that they free space allowing good adaptation of the cover element 206 to the topography of the part of the user's head that is contacted by the contact surface 203.1 of the abutment unit 203.

A further difference to the first example lies in the pronouncedly conical shape of the connector section 205.2 in the part adjacent to the contact section 205.1. This configuration at least in part compensates for a potential loss in stiffness caused by the radial recesses 205.8. Hence, here as well, a particularly compact, light-weight and stiff design with good vibration transmission is achieved.

Third Example

Figure 6:
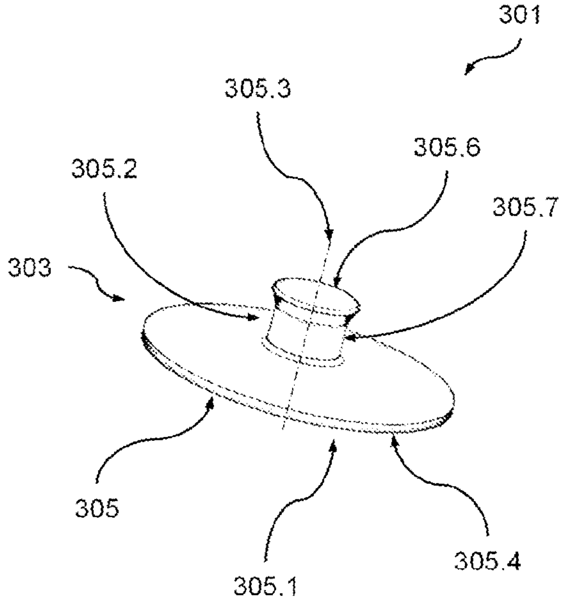
FIG. 6 is a schematic perspective view of a detail of a further variant of the hearing system according to the present disclosure.

In the following, a further example of a hearing system 301 with an abutment unit 303 according to the present disclosure will be described with reference to FIG. 6. The hearing system 301 in its basic design and functionality corresponds to the hearing system 101 of the first example. In particular, the abutment unit 303 and may simply replace the abutment unit 103 in the hearing system of FIGS. 1 to 4. While identical components are given the same reference, like components are given a reference increased by the value 200 (compared to the first example). Unless stated otherwise in the following, as regards the properties and functionality of these components, explicit reference is made to the explanations given above in the context of the first example.

The only difference with respect to the first example lies in the design of the contact element 305. First, the contact section 305.1 has a generally planar interface surface 305.4 facing away from the connector section 305.2 and facing towards the cover element 106 (not shown). Moreover, the connector section 305.2 is a solid cylindrical component.

Essentially, here as well a particularly light-weight yet stiff configuration of the contact element 305 is achieved, which exhibits the corresponding advantages as described above.

Fourth Example

In the following, an example of a binaural hearing system 401 with two abutment units 403 according to the present disclosure will be described with reference to FIGS. 1, 6 and 7. The hearing system 401 in its basic design and functionality corresponds to the hearing system 101 of the first example. In particular, the hearing system 401 may simply replace the hearing system 101 of FIGS. 1 to 4 in case of a user with hearing impairment at both ears. While identical components are given the same reference, like components are given a reference increased by the value 300 (compared to the first example). Unless stated otherwise in the following, as regards the properties and functionality of these components, explicit reference is made to the explanations given above in the context of the first example.

In the bilateral or binaural hearing system 401, an ear element 402.3 is located at each of the first free end 402.1 and the second free end 402.2 of the support unit 402, and an abutment unit 303 (as described above in relation to the third example) is located adjacent to each one of the ear elements 402.3, such that an essentially symmetric arrangement may be formed. The ear elements 402.3 correspond to the ear element 102.3 as it has been described above in the context of the first example.

When placed at the user's head 104 (instead of the hearing system 101 of FIG. 1) a contact surface 303.1 of each of the abutment units 303 contacts the user's head 104. More precisely, the support unit 402 is placed at the user's head 104 such that the contact surface 303.1 of the respective abutment unit 303 contacts the user's head 104 in an area surrounding one of the user's ears 104.1, namely in an area of the user's left and right mastoid bone, respectively.

In the present example, the support unit 402 and the abutment unit 303 are configured such that the respective abutment unit 303, when contacting the user's head 104 with the contact surface 303.1, exerts a resultant contact force RCF across the contact surface 303.1 in a resultant contact force direction RCFD (as it has been described above in the context of the first example).

Each abutment unit 303 is again mounted to the support unit 402 by a decoupling unit 107 (as it has been described above in the context of the first example). As can be seen from FIG. 7, in the present example, the respective decoupling unit 107 is integrated in a mounting recess 402.4 of the support unit 402. In the present example, the connector section 305.2 of the contact element 305 extends into and through the mounting recess 402.4 of the support unit 402, such that a particularly simple, compact and lightweight design is achieved.

With some variants, the ear element 402.3 is configured such that it does not apply forces to the user's head 104 which tend to reduce the contact pressure CP at the contact surface 303.1 of the respective abutment unit 303, thereby enabling maintaining a largely stable and defined contact pressure CP at the contact surface 303.1 of the respective abutment unit 303.

With certain variants, the support unit 402 may again be configured such that the abutment unit 303, when contacting the user's head 104 with the contact surface 303.1 (e.g., in the area of the user's respective mastoid bone) on each side of the user's head 104 exerts the resultant contact force RCF across the contact surface 303.1 in the resultant contact force direction RCFD by virtue of elastic deformation of the support unit 402. Here, the support unit 402 may again be configured such that the resultant contact force RCF is substantially the only force exerted on the user's head 104 on that respective side of the user's head 104 caused by the elastic deformation of the support unit 102. This configuration as well enables maintaining a largely stable and defined contact pressure CP at the contact surface 303.1 of the abutment unit 303.

Figure 7:
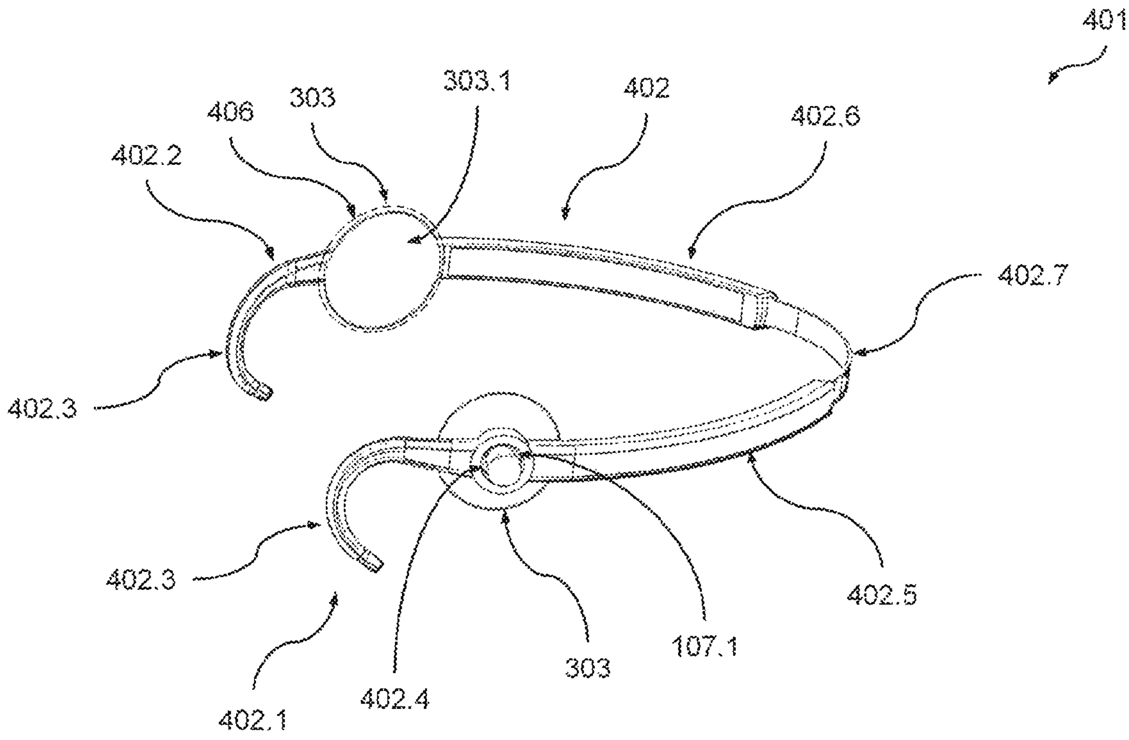
FIG. 7 is a schematic perspective view of a further variant of the hearing system according to the present disclosure.

As can be inferred from FIG. 7, the support unit 402 may again be configured in the manner of a so called neck-band, which is adjustable in its length between the first free end 402.1 and the second free end 402.2. Adjustment may be achieved by a sliding and locking mechanism between a third support unit part 402.7 and either of the first support unit part 402.5 and the second support unit part 402.6 of the support unit 402.

In the present example, a crating unit (not shown in FIG. 7) may be operatively coupled to each of the abutment unit 303, both then forming part of a first and second hearing device of the hearing system 401. The hearing device may be a hearing aid where the vibration generating unit includes a sound processing unit which is configured to process input sound signals captured (e.g., by one or more microphones) in order to generate appropriate vibration to be transmitted to the user's head 104 in order to compensate for a hearing impairment of the user as generally explained above.

It will be appreciated that, with some variants, the contact surface 303.1 of the abutment unit 303 may be directly formed by the interface surface 305.4 of the contact element 305. With other variants, a cover element 406 similar to cover element 106 may be placed between the interface surface 305.4 of one or each of the contact elements 305 and the user's head 104.

Figure 9A:
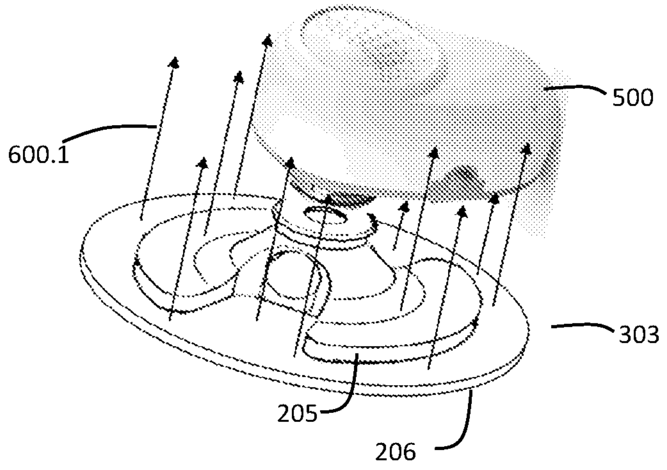
FIGS. 9A to 9C illustrate different examples of the hearing system.
Figure 9B:
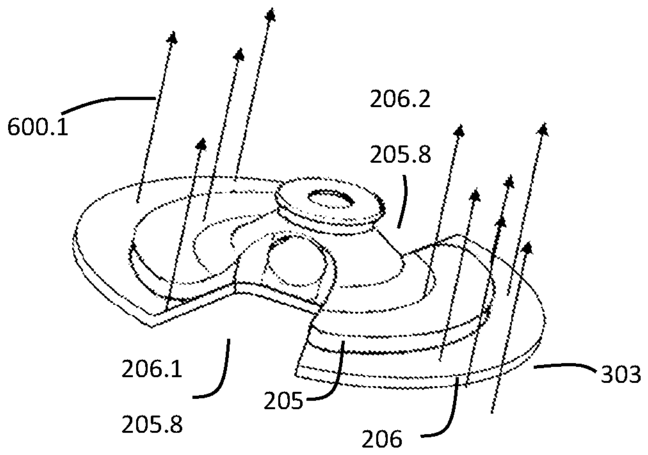
Figure 9C:
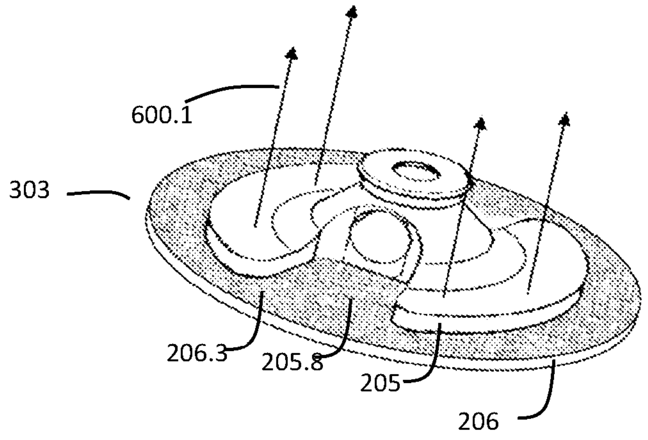

FIGS. 9A to 9C illustrate different examples of the hearing system 201 including a vibration generating unit 500 coupled to the abutment 303. Several reflections 600.1 from the contact element 205 and the cover element 206 may appear, and the reflections 600.1 may be directed towards the microphones of the vibration generating unit 500 creating unwanted feedback in the output, i.e. the sound transmission. FIGS. 9B and 9C illustrate different solutions to the problem illustrated in FIG. 9A. In FIG. 9B, the at least two radial recesses 205.8 of the contact element may be aligned with at least two radial recesses 206.1 of the cover element 206. In another example, not illustrated, the at least two radial recesses 205.8 of the contact element may be misaligned with the at least two radial recesses 206.1 of the cover element 206. At least two radial recesses 206.1 of the cover element may be arranged just above the microphones so that no reflections 600.1 will be directed towards the microphones, resulting in a reduction of unwanted feedback in the sound transmission. In FIG. 9C the solution to the feedback problem is to coat 206.3 an upper layer of the cover element 206 with a material configured to absorb any reflections from the cover element 206. The coating material 206.3 may consist of polyurethane foam, pressed and matting fibers, polyester fiber, fiber glass, mass loaded vinyl, cork, green blue glue, silicone, epoxy, and a combination thereof.

It is intended that the structural features of the devices described above, either in the detailed description and/or in the claims, may be combined with steps of a corresponding method, when appropriately substituted by a corresponding process.

Figure 10A:
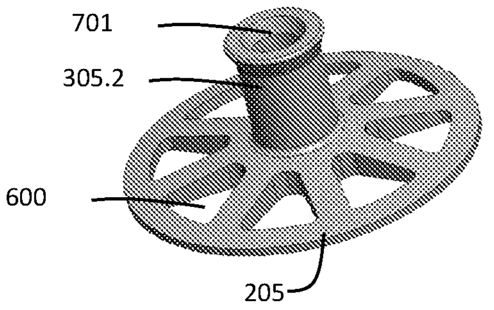
FIGS. 10A and 10B illustrate different examples of the abutment.
Figure 10B:
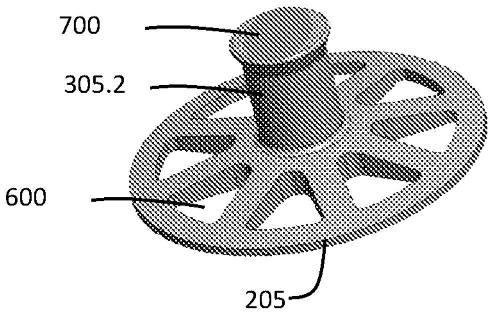

FIGS. 10A and 10B illustrate different examples of the abutment 303. In FIG. 10A, the connector section 305.2 includes a hollow core and the contact element 205 includes multiple holes 600 for reducing the weight of the contact element 205. FIG. 10B illustrates a similar abutment 303 but the connector section 30.2 is with a none-hollow core.

Figure 11A:
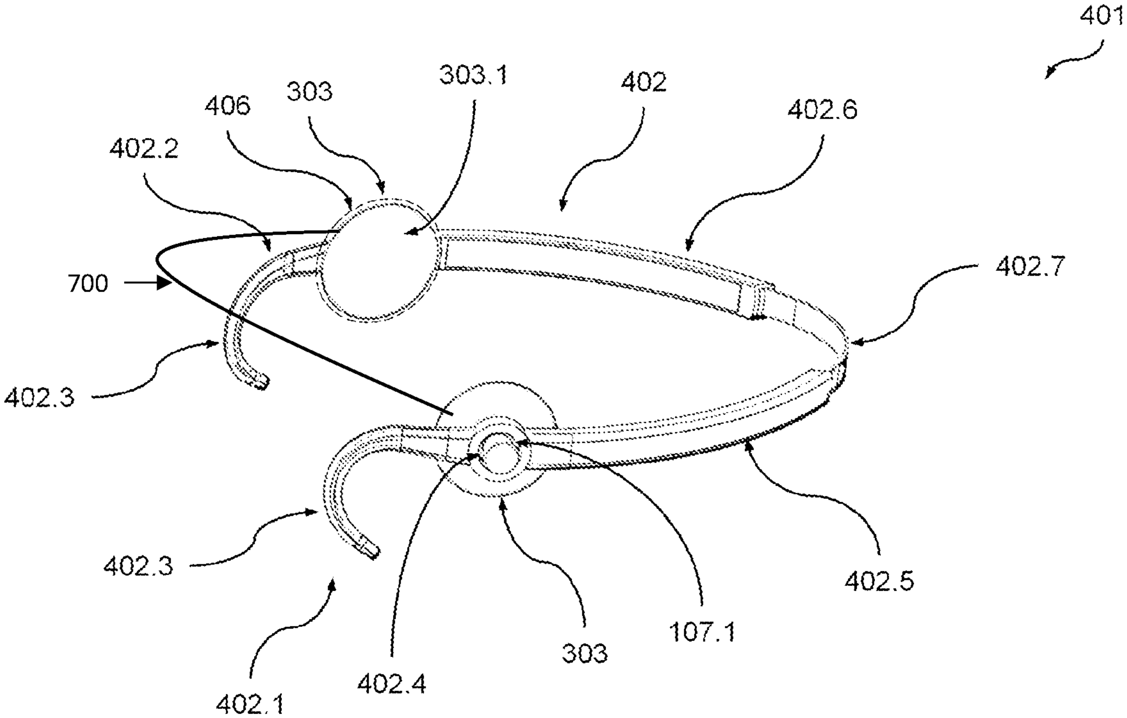
FIGS. 11A and 11B illustrate different examples of the support unit.
Figure 11B:
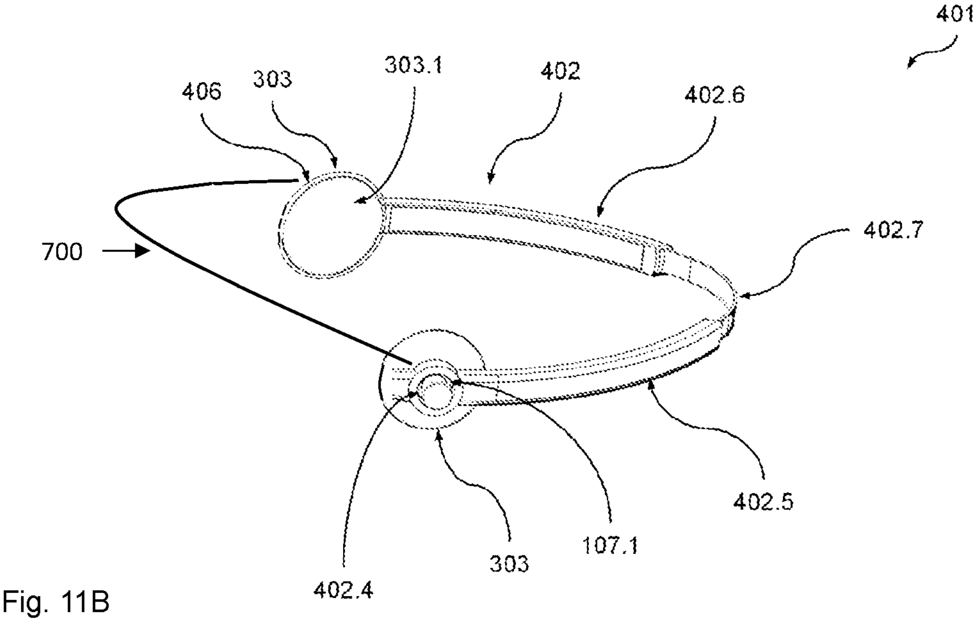

FIGS. 11A and 11B illustrate the binaural hearing aid system 401 including a safety line 700. In this specific example the safety line 700 includes a first end and a second end, and both ends is applied to the support unit 402, and when the recipient is wearing the support unit 402, the safety line 700 is arranged across or around the head of the recipient. Each of the free ends 402.2 of the support unit 402 accommodates an ear element 402.3, the ends of the safety line 700 is applied on the support unit 402 and between the free ends of the support unit 402.2, for example, in a hole applied into the support unit 402 or a loop applied onto the support unit 402 or via a disengaging mean.

FIG. 11B illustrate an example where the ear elements 402.3 are detached from the support unit 402, and to keep the support unit on the head the safety line 700 is needed.

Figure 12:
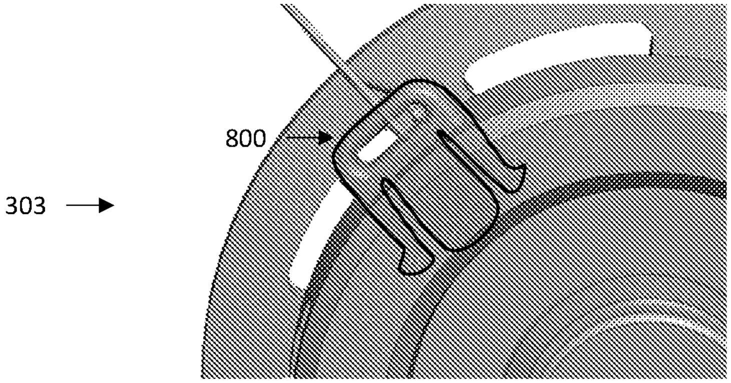
FIG. 12 illustrates a disengaging mean.

FIG. 12 illustrate an example where the safety line includes a disengaging mean 800 configured to disengage the safety line 700 from the vibration generating unit or the support unit 402. In this specific example, the disengaging mean 800 is applied onto the abutment unit 303.

Figure 13:
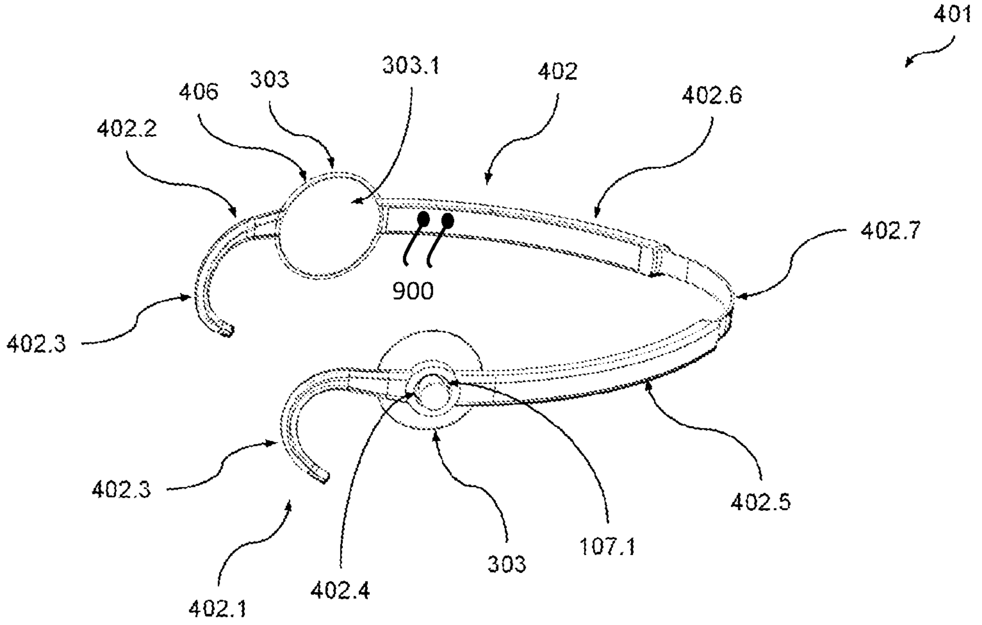
FIG. 13 illustrates an example of the hearing system.

FIG. 13. Illustrates an example of the hearing system 401 (also relevant for 101) including one or more EEG electrodes 900 arranged on one side of the head of the user of the hearing system.

As used, the singular forms “a”, “an”, and “the” are intended to include the plural forms as well (i.e., to have the meaning “at least one”), unless expressly stated otherwise. It will be further understood that the terms “includes”, “comprises”, “including” and/or “comprising”, when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being “connected” or “coupled” to another element, it can be directly connected or coupled to the other element, but an intervening element may also be present, unless expressly stated otherwise. Furthermore, “connected” or “coupled” as used herein in the context of signal transmission may include wirelessly connected or coupled. As used herein, the term “and/or” includes any and all combinations of one or more of the associated listed items. The steps of any disclosed method are not limited to the exact order stated herein, unless expressly stated otherwise.

It will be further appreciated that reference throughout this specification to “one embodiment” or “an embodiment”, “one example” or “an example”, “one variant” or “a variant” or “an aspect” or features included as “may” means that a particular feature, structure or characteristic described in connection with the embodiment etc. is included in at least one embodiment etc. of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean “one and only one” unless specifically so stated, but rather “one or more.” Unless specifically stated otherwise, the term “some” refers to one or more.

Accordingly, the scope should be judged in terms of the claims that follow.

The invention claimed is:

1. A hearing system comprising a support unit, and an abutment unit comprising a contact element, the contact element including a plate-shaped contact section on one side of which is formed a contact surface of the abutment unit, wherein the support unit supports the abutment unit;

the support unit is configured to be placed at a user’s head such that the contact surface contacts the user’s head in an area of one of the user’s mastoid bones;

the contact element is configured to transmit vibrations towards the contact surface;

the contact surface comprises a plurality of concentric ridges formed from a plurality of peaks and valleys;

the abutment unit comprises a cover element that is connected to and covers the contact section of the contact element;

the cover element, in a radial direction of the contact element, at least section-wise protrudes beyond the contact section of the contact element by 0.5 mm to 7 mm;

the cover element, in a direction perpendicular to a plane of main extension of the contact section, has a maximum thickness ranging from 0.5 mm to 5 mm; and the cover element is complementarily structured to match the plurality of concentric ridges of the contact section.

2. The hearing system according to claim 1, wherein the contact element comprises plastic material selected from a plastic group consisting of nylon 12, nylon 66, liquid crystal polymer, Polyphenylen sulfid, Polyether ether ketone, Polyphthalamide, Acrylonitrile butadiene styrene, Polyoxymethylene, and a combination thereof.

3. The hearing system according to claim 2, wherein the contact element further comprises a pin shaped connector section;

the contact section defines a plane of main extension, a radial direction and a circumferential direction; and the connector section defines a longitudinal axis;

wherein the connector section satisfies at least one of the following:

the connector section protrudes from the contact section in a direction facing away from the contact surface;

the connector section, in the radial direction of the contact section, is located centrally at the contact section; and the longitudinal axis of the connector section is perpendicular to the plane of main extension of the contact section.

4. The hearing system according to claim 2, wherein the cover element is connected to the contact section of the contact element and forms the contact surface of the abutment unit; and the cover element is made of a cover element material selected from the group consisting of a polymer material, a polymer foam material, a polymer memory foam material, a polyurethane (PU) foam material, a polymer foam material having a resonant frequency in the area of a resonant frequency of human skin, rubber foam, latex, neoprene, Thermoplastic elastomer (TPE), and combinations thereof.

5. The hearing system according to claim 1, wherein the contact element further comprises a pin shaped connector section;

the contact section defines a plane of main extension, a radial direction and a circumferential direction; and the connector section defines a longitudinal axis;

wherein the connector section satisfies at least one of the following:

the connector section protrudes from the contact section in a direction facing away from the contact surface;

the connector section, in the radial direction of the contact section, is located centrally at the contact section; and the longitudinal axis of the connector section is perpendicular to the plane of main extension of the contact section.

6. The hearing system according to claim 5, wherein the contact section satisfies at least one of the following:

the contact section, in a perpendicular view onto the plane of main extension of the contact section, has an outer contour selected from a group consisting of a section-wise curved contour, an elliptic contour, a circular contour, a section-wise polygonal contour;

in the area of the contact surface, the thickness of the contact section tapers in the radial direction towards an outer contour of the contact section;

the contact section has an interface surface facing away from the connector section, the interface surface being at least one of at least section-wise planar, and at least section-wise provided with the plurality of ridges, wherein at least a part of the plurality of ridges extends in the circumferential direction or in the radial direction; and the contact section has at least two radial recesses, the radial recesses at least one of extending inwards from the outer contour of the contact section, extending up to the connector section, and being mutually collinear.

7. The hearing system according to claim 6, wherein the connector section satisfies at least one of the following:

the connector section has a shape selected from a group consisting of a section-wise cylindrical shape, a section-wise conical shape, a section-wise prismatic shape, and combinations thereof;

the connector section is at least section-wise hollow;

the connector section forms a support connector interface connected to the support unit; and the connector section, at an end facing away from the contact section, forms a vibration generator interface configured to connect to a vibration generating unit.

8. The hearing system according to claim 6, wherein the cover element forms the contact surface of the abutment unit; and the cover element is made of a cover element material selected from the group consisting of a polymer material, a polymer foam material, a polymer memory foam material, a polyurethane (PU) foam material, a polymer foam material having a resonant frequency in the area of a resonant frequency of human skin, rubber foam, latex, neoprene, Thermoplastic elastomer (TPE), and combinations thereof.

9. The hearing system according to claim 5, wherein the connector section satisfies at least one of the following:

the connector section has a shape selected from a group consisting of a section-wise cylindrical shape, a section-wise conical shape, a section-wise prismatic shape, and combinations thereof;

the connector section is at least section-wise hollow;

the connector section forms a support connector interface connected to the support unit; and the connector section, at an end facing away from the contact section, forms a vibration generator interface configured to connect to a vibration generating unit.

10. The hearing system according to claim 5, wherein the cover element forms the contact surface of the abutment unit; and the cover element is made of a cover element material selected from the group consisting of a polymer material, a polymer foam material, a polymer memory foam material, a polyurethane (PU) foam material, a polymer foam material having a resonant frequency in the area of a resonant frequency of human skin, rubber foam, latex, neoprene, Thermoplastic elastomer (TPE), and combinations thereof.

11. The hearing system according to claim 1, wherein the cover element forms the contact surface of the abutment unit; and the cover element is made of a cover element material selected from the group consisting of a polymer material, a polymer foam material, a polymer memory foam material, a polyurethane (PU) foam material, a polymer foam material having a resonant frequency in the area of a resonant frequency of human skin, rubber foam, latex, neoprene, thermoplastic elastomer (TPE), and combinations thereof.

12. The hearing system according to claim 1, wherein the contact surface, in a radial direction of the contact element, has a maximum diameter ranging from 10 mm to 15 mm.

13. The hearing system according to claim 1, wherein the support unit and the abutment unit are configured such that the abutment unit, when contacting the user's head with the contact surface in an area of one of the user's mastoid bones, exerts a contact pressure on the user's head, the contact pressure resulting in an average contact pressure and a resultant contact force across the contact surface;

wherein the contact pressure satisfies at least one of the following:

the resultant contact force ranges from 1N to 4N; and the average contact pressure ranges from $10N/cm^2$ to $60N/cm^2$.

14. The hearing system according to claim 1, wherein the support unit and the abutment unit are configured such that the abutment unit, when contacting the user's head with the contact surface in an area of one of the user's mastoid bones, exerts a resultant contact force across the contact surface in a resultant contact force direction; and the abutment unit is mounted to the support unit by a decoupling unit;

wherein the decoupling unit satisfies at least one of the following:

the decoupling unit decouples forces between the support unit and the abutment unit in directions perpendicular to the resultant contact force direction;

the decoupling unit decouples moments between the support unit and the abutment unit about an axis parallel to the direction of the resultant contact force direction; and the decoupling unit is configured such that the abutment unit is freely rotatable with respect to the support unit about an axis parallel to the direction of the resultant contact force direction.

15. The hearing system according to claim 14, wherein the decoupling unit satisfies at least one of the following:

the decoupling unit comprises a damping unit; and the decoupling unit comprises a damping material selected from a damping material group consisting of fluorosilicone, silicone, fluorocarbon, rubber, TPE, and combinations thereof.

16. The hearing system according to claim 14, wherein the contact element further comprises a pin shaped connector section;

wherein the hearing system satisfies at least one of the following:

the decoupling unit is mounted to a part of the connector section;

decoupling unit is integrated in a mounting recess of the support unit; and the connector section extends through a mounting recess of the support unit.

17. The hearing system according to claim 1, wherein the support unit is a C-shaped unit with a first free end and a second free end;

at least one of the free ends accommodates an ear element configured to engage a part of one ear of the user to position the hearing system with respect to the user's head;

wherein the hearing system satisfies at least one of the following:

the ear element is located at the first free end and the abutment unit is located in the area of the second free end; and each of the first free end and the second free end is provided with the ear element, and an abutment unit is located adjacent to each of the ear elements.

18. The hearing system according to claim 1, wherein the support unit satisfies at least one of the following:

the support unit is configured such that the abutment unit, when contacting with the contact surface the user's head in an area of the user's mastoid bone on a first side of the user's head, exerts a resultant contact force across the contact surface in a resultant contact force direction by virtue of elastic deformation of the support unit;

the support unit is configured in the manner of a neckband;

the support unit is configured to be adjustable in its length between the first free end and the second free end.

* * * * *